United States Patent [19]
Osterman

[11] 3,733,605
[45] May 15, 1973

[54] INTERRUPTED FEEDBACK CANCELLATION IN A RADAR SYSTEM

[75] Inventor: Laurence Oliver Osterman, Utica, N.Y.

[73] Assignee: General Electric Company, Utica, N.Y.

[22] Filed: Oct. 23, 1970

[21] Appl. No.: 83,325

[52] U.S. Cl. ................................................343/7.7
[51] Int. Cl. ...............................................G01s 9/42
[58] Field of Search .....................343/7.7; 330/51

[56] References Cited

UNITED STATES PATENTS

| | | | |
|---|---|---|---|
| 3,157,875 | 11/1964 | Matsukasa et al. | 343/7.7 |
| 3,222,602 | 12/1965 | Gager et al. | 343/7.7 |
| 3,218,561 | 11/1965 | Moeller | 330/51 |
| 3,237,116 | 2/1966 | Skinner et al. | 330/51 UX |
| 3,426,285 | 2/1969 | Uhrig | 330/51 |

FOREIGN PATENTS OR APPLICATIONS

| | | | |
|---|---|---|---|
| 763,195 | 12/1956 | Great Britain | 343/7.7 |

Primary Examiner—Benjamin A. Borchelt
Assistant Examiner—G. E. Montone
Attorney—Irving M. Freedman, Robert P. Cogan, Joseph B. Forman, Frank L. Neuhauser and Oscar B. Waddell

[57] ABSTRACT

In a radar system a canceller circuit including in one form a single delay means which produces an output signal having an order of cancellation equal to that of the canceller circuit using two delay means. Undelayed and delayed video or intermediate frequency inputs are coupled from a signal input to a subtractor. A first input of a summing circuit is connected between the signal input and the delay means, and the output of the subtractor is connected to a second input of the summing junction on alternate interpulse periods of the radar system.

8 Claims, 4 Drawing Figures

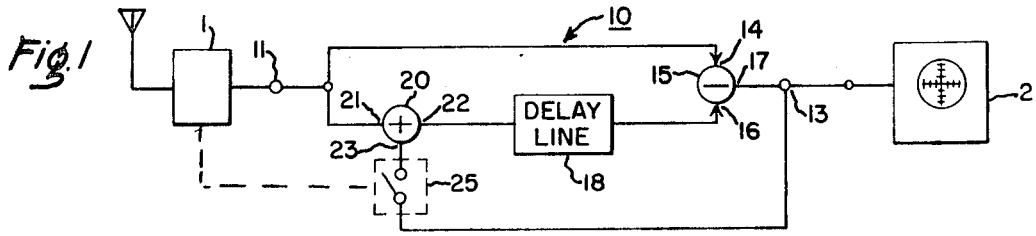

| TIME | SWITCH 25 CONDITION | TERMINAL 11 (INPUT) | TERMINAL 13 (OUTPUT) | TERMINAL 22 |
|---|---|---|---|---|
| $t_1$ | OPEN | $e(t_1)$ | $e(t_1)$ | $e(t_1)$ |
| $t_2$ | CLOSED | $e(t_2)$ | $e(t_2)-e(t_1)$ | $2e(t_2)-e(t_1)$ |
| $t_3$ | OPEN | $e(t_3)$ | $e(t_3)-2e(t_2)+e(t_1)$ | $e(t_3)$ |
| $t_4$ | CLOSED | $e(t_4)$ | $e(t_4)-e(t_3)$ | $2e(t_4)-e(t_3)$ |
| $t_5$ | OPEN | $e(t_5)$ | $e(t_5)-2e(t_4)+e(t_3)$ | $e(t_5)$ |
| . | . | . | . | . |
| $t_n$ | CLOSED | $e(t_n)$ | $e(t_n)-e(t_{n-1})$ | $2e(t_n)-e(t_{n-1})$ |
| $t_{n+1}$ | OPEN | $e(t_{n+1})$ | $e(t_{n+1})-2e(t_n)+e(t_{n+1})$ | $e(t_{n+1})$ |

Fig. 4

| TIME | SWITCH 25 CONDITION | TER'L 11 | TERMINAL 17 | TERMINAL 13 | TERMINAL 22 |
|---|---|---|---|---|---|
| $t_1$ | OPEN | $e(t_1)$ | $e(t_1)$ | $e(t_1)$ | $e(t_1)$ |
| $t_2$ | OPEN | $e(t_2)$ | $e(t_2)-e(t_1)$ | $e(t_2)-e(t_1)$ | $e(t_2)$ |
| $t_3$ | CLOSED | $e(t_3)$ | $e(t_3)-e(t_2)$ | $e(t_3)-2e(t_2)+e(t_1)$ | $2e(t_3)-2e(t_2)+e(t_1)$ |
| $t_4$ | OPEN | $e(t_4)$ | $e(t_4)-2e(t_3)+e(t_2)+e(t_1)$ | $e(t_4)-3e(t_3)+3e(t_2)-e(t_1)$ | $e(t_4)$ |
| $t_5$ | OPEN | $e(t_5)$ | $e(t_5)-e(t_4)$ | $e(t_5)-2e(t_4)+2e(t_3)-2e(t_2)+e(t_1)$ | $e(t_5)$ |
| . | . | . | . | . | . |
| $t_n$ | CLOSED | $e(t_n)$ | $e(t_n)-e(t_{n-1})$ | $e(t_n)-2e(t_{n-1})+e(t_{n-2})$ | $2e(t_n)-2e(t_{n-1})+e(t_{n-2})$ |
| $t_{n+1}$ | OPEN | $e(t_{n+1})$ | $e(t_{n+1})-2e(t_n)+e(t_{n-1})+(e(t_{n-2}))$ | $e(t_{n-1})-3e(t_n)+3e(t_{n-1})-e(t_{n-2})$ | $e(t_{n+1})$ |
| $t_{n+2}$ | OPEN | $e(t_{n+2})$ | $e(t_{n+2})-e(t_{n+1})$ | $e(t_{n+2})-2e(t_{n+1})+2e(t_n)-2e(t_{n-1})+e(t_{n-2})$ | $e(t_{n+2})$ |

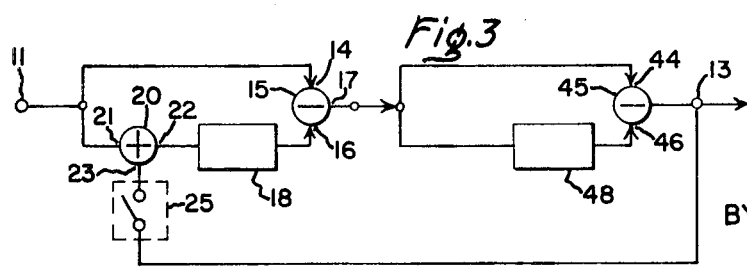

Fig. 3

INVENTOR:
LAURENCE O. OSTERMAN,

BY Robert P. Cogan
HIS AGENT

INTERRUPTED FEEDBACK CANCELLATION IN A RADAR SYSTEM

BACKGROUND OF THE INVENTION

This invention relates to moving target indicator (MTI) radar systems, and more particularly to canceller circuits within such systems.

A moving target radar system is a system within which a response is provided which is indicative of the phase difference between successive echo pulses. Pulses reflected from a moving target have a different relative phase. The presence or absence of a moving target within the range of a radar antenna is determined by applying successive reflected pulses to a canceller circuit.

A conventional canceller circuit includes at least one canceller stage. A canceller stage includes a signal input terminal and a subtractor circuit which provides a cancelled output. A first input terminal of the subtractor circuit is directly coupled to the signal input terminal, and a delay line is coupled between the signal input terminal and a second input of the subtractor circuit. The delay period of the delay line must be equal to the time between successive pulses. Thus, if echo pulses are received from a stationary target, the successive reflected pulses cancel each other and a zero output is provided.

Since the canceller stage includes one delay line, the output has a first order cancellation. The order of cancellation may be increased by cascading a plurality of canceller stages to provide a significant improvement in rejection of signals returned from a stationary background other than the target, commonly known as clutter.

In prior circuits, this requires the use of at least another delay line, which may present several disadvantages. In both typical surveillance and typical airborne attack radar, analog delay lines are quite expensive, costing several thousands of dollars. Also, in airborne attack radar, both size and weight of a radar system are critical considerations, and the use of a plurality of delay lines increases both the size and the weight of the system.

Electronic disadvantages are also present. Where a plurality of delay lines are utilized in analog embodiments, complicated circuitry must be utilized to regulate the delay periods of both delay lines to assure that they both produce the same delay time. Further, the possibility of differing temperature stability of the delay lines may lead to different delay periods and hence lead to inaccuracy in the output signal. Thus, it is extremely desirable to provide a higher order of cancellation than that which is produced by a conventional canceller stage while not increasing the number of delay lines used.

SUMMARY OF THE INVENTION

It is therefore an object of the present invention to provide a canceller circuit in which interrupted feedback or its equivalent is utilized to improve cancellation of the output.

It is another object of the present invention to provide in a moving target indicator radar system a canceller circuit providing a higher order of cancellation than the number of delay lines in which it includes.

It is a specific object of one form of the present invention to provide a canceller circuit providing second order cancellation while eliminating errors introduced due to nonuniformity in successive delay lines.

It is also an object of the present invention to provide a canceller circuit in a moving target radar providing greater than first order cancellation which is simple and inexpensive in construction compared to prior canceller circuits providing greater than first order cancellation.

Briefly stated, in accordance with the present invention, there is provided a canceller circuit for a moving target indicator radar system in which interrupted feedback is utilized to improve cancellation of the output. In one form of the invention, a signal input terminal is coupled directly and also by a delay means to first and second inputs of a subtractor circuit which provides an output. A summing circuit has a first input coupled to the signal input terminal and an output coupled to the input of the delay means. A second input of the summing circuit is coupled by switching means to the output of the subtractor circuit. Interrupted feedback is provided by closing the switching means during alternate interpulse periods of the radar system. During alternate interpulse periods of the radar system, the canceller circuit provides an output having second order cancellation. In other forms of the invention further canceller stages may be included in the canceller circuit, and the interrupted feedback or an equivalent input connected to the input of a delay means may be provided in an alternative manner to improve cancellation of the output.

BRIEF DESCRIPTION OF THE DRAWINGS

The foregoing objects and features of novelty which characterize the invention and the circuitry in which they are embodied are pointed out with particularity in the claims forming the concluding portion of the specification. The invention, both as to its organization and the manner of operation, may be further understood by reference to the following description taken in connection with the drawings.

Of the drawings:

FIG. 1 is a block diagrammatic representation of a canceller circuit constructed in accordance with the present invention and incorporated in a moving target radar indicator system;

FIG. 2 is a chart illustrating the operation of FIG. 1;

FIG. 3 is a block diagrammatic representation of another form of the present invention; and FIG. 4 is a chart illustrative of the operation of the circuit of FIG. 3.

DESCRIPTION OF THE PREFERRED EMBODIMENTS

FIG. 1 is illustrative of a canceller circuit 10 constructed in accordance with the present invention connected between a moving target indicator receiver 1 and a conventional moving target indicator display means 2. The canceller circuit 10 comprises a canceller stage and further circuitry described below. The radar system transmits a train of pulses, each pulse originating during a sweep of the radar system. A video or intermediate frequency input pulse train, indicative of successive received echo pulses, is applied from the receiver 1 to a signal input terminal 11. Signals are directly coupled from the signal input terminal 11 to a first input 14 of the subtractor 15 having an output terminal 17 coupled to an output terminal 13. The signals are also coupled to a second input 16 of the subtractor 15 from the terminal 11 via a delay means 18. The subtractor 15 operates in a conventional manner to provide a cancelled output at the output terminal 13. The delay means 18 may include a conventional delay line and any desired amplification circuitry in an analog embodiment. In a digital embodiment, the delay means 18 may comprise well-known shift registers.

In order to further implement the present invention, a summing circuit 20 is provided having a first input 21 coupled to the signal input terminal 11 and an output terminal 22 coupled to the input of the delay means 18. A switching means 25 is coupled between the output terminal 13 and a second input 23 of the summing circuit 20. The switching means 25 is actuatable to connect the output at the terminal 13 to the second input 23 of the summing circuit 20. The switching means 25 is actuated, i.e., closed, during selected time periods, for example during alternate interpulse periods of the radar system and is actuated by any convenient means. For example, a dotted line is drawn from the switching means 25 from the receiver 1 to illustrate that in the embodiment of FIG. 1, switching means 25 is synchronized by the transmit-receive circuitry of the radar system. The selection of time periods, e.g., whether during every other interpulse period or during some other interpulse periods, during which the switching means 25 is actuated is made by examining the mathematical form of the desired output of the canceller circuit 10.

Operation of the Circuit

The operation of the circuit of FIG. 1 is illustrated in FIG. 2. Successive pulses are transmitted during successive sweeps of the radar system. Successive pulses indicative of echo pulses are receivable at the signal input terminal 11 at times $t_1, t_2, t_3 \ldots$, (Time column, FIG. 2), each point in time spaced from the next by the period of one sweep of the radar circuit. Two successive points in time e.g., $t_1 - t_2$, define one interpulse period. The Switch Condition column of FIG. 2 illustrates the condition of the switching means 25 during each interpulse period. The columns Terminal 11, Terminal 13, and Terminal 22 illustrate the outputs appearing respectively thereat at the end of each time period.

It is assumed that during a first sweep, the switching means 25 is open. During a second sweep, the switching means 25 is closed (i.e., actuated) so that interrupted feedback is applied from the output terminal 13 to the input of the summing circuit 20. Operation proceeds as illustrated in FIG. 2. The notation $t_n$ and $t_{n+1}$ is utilized to indicate successive time periods in a generalized expression. An output is provided at the output terminal 13 having a second order cancellation on alternate sweeps.

An output having second order cancellation is recognized by examining the form by which it is mathematically expressed. For example, the outputs listed in the Terminal 13 column having the quadratic form, i.e., those in which the coefficients of the terms are 1, 2, 1, have second order cancellation. In further embodiments, outputs having other orders of cancellation may also be recognized by noting their form. The well-known Pascal's triangle provides a simple mnemonic device for recognizing the form of expressions indicative of higher-order cancellation. While only half the output pulses have a second order cancellation and the other output pulses have a first order cancellation, overall system performance is improved in that clutter rejection is significantly improved.

Referring now to FIG. 3 there is illustrated another form of the present invention connected between the input terminal 11 and the output terminal 13 including two canceller stages and which provides a higher order of cancellation than the circuit of FIG. 1. In FIG. 3, the same reference numerals are used to denote elements corresponding to those of the circuit of FIG. 1. In the embodiment of FIG. 3, the output terminal 17 of the subtractor 15 is connected to a first input 44 of a subtractor 45 and is also coupled to a delay means 48 having an output connected to a second input 46 of the subtractor 45. The output of the subtractor 45 is connected to the output terminal 13. The second input 23 of the summing circuit 20 is again connected to one terminal of the switching means 25, the other terminal of which is connected to the output terminal 13. The switching means 25 is operated in the same manner as in the embodiment of FIG. 1. The switching means 25 is closed during every third interpulse period of the radar system to provide the signals during successive interpulse periods as tabulated in FIG. 4. In FIG. 4, the same form of notation is used as in FIG. 3. In this embodiment, an output having third order cancellation, recognizable in the manner described above, is provided at the output terminal 13 during every third interpulse period of the radar system while only two delay lines are utilized. Other outputs, while not being pure third order cancelled outputs, still embody greater clutter rejection than is provided by a conventional canceller stage.

In order to provide a canceller circuit constructed in accordance with the present invention, it is not essential to physically connect feedback from the output of a canceller stage to the input of a summing circuit. What is essential is that the proper signals be supplied within the canceller circuit to provide the desired outputs. More specifically, the present invention may be implemented by including in a canceller stage means for providing to the input of a delay means (e.g., the delay means 18 of FIG. 1) an interrupted input which input is equivalent to a cancelled output from the output of the canceller stage. Such means may comprise the embodiments of FIGS. 1 and 3 described above. Alternatively, in order to implement the operation of FIG. 2 in accordance with the present invention, such means could comprise a canceller stage further including means for doubling the input from a signal input terminal to a delay means and means for subtracting the output of the delay means for the input to the delay means. Both the doubling means and subtracting means would operate in an interrupted manner as does the switching means 25 of the embodiment of FIG. 1. This arrangement will provide an output having second order cancellation. Similar related arrangements will suggest themselves to implement the operation illustrated in FIG. 4 or to provide other embodiments of the present invention.

It is thus seen that the present invention provides for the introduction of interrupted feedback or its equivalent in what would otherwise be a conventional canceller circuit in order to improve output signal characteristics while minimizing cost and complexity of the circuit. The interrupted feedback may be provided to produce outputs having integral orders of cancellation or to provide outputs having other forms.

What is claimed as new and desired to be secured by Letters Patent of the United States is:

1. In a radar system as canceller circuit for connection between a moving target indicator receiver providing a pulse train at a signal input terminal and moving target indicator display means, the combination comprising:
   a. an output terminal for connection to said moving target indicator display means;
   b. a first subtractor circuit having first and second inputs and an output coupled to said output terminal;
   c. means connecting a first input of said subtractor circuit to the signal input terminal;
   d. a delay means coupled between the signal input terminal and the second input of said first subtractor;
   e. a summing circuit having a first input coupled to the output of said moving target indicator receiver, an output coupled to the input of said delay line, and a second input;
   f. switching means coupled between the output of said first subtractor and the second input of said summing circuit, said switching means being actuatable to be closed; and
   g. means for actuating said switching means during alternate interpulse periods of the inputs supplied from the said moving target indicator receiver.

2. The arrangement of claim 1 further comprising a second subtractor having first and second inputs and an output, a second delay line coupled between the output of said first subtractor and a first input of said second subtractor, a second delay line, means coupling the output of said first subtractor to a second input of said second subtractor, and means connecting the output of said second subtractor to said output terminal.

3. In a moving target indicator radar system, a canceller circuit for connection between a moving target indicator receiver and a moving target indicator display utilization means, comprising in combination:
   a. a signal input terminal for connection to the output of the moving target indicator receiver;
   b. an output terminal for connection to the moving target indicator display means;
   c. a plurality of canceller stages connected in cascade between said signal input terminal and said output terminal;
   d. a summing circuit having a first input connected to said signal input terminal and an output terminal connected to the input of a delay means included in a first of said canceller stages, and a second input;
   e. actuatable switching means connected between a second input of said summing circuit and said output terminal; and
   f. means for actuating said switching means to close the circuit between said output terminal and the second input of said summing circuit during selected time periods.

4. The arrangement according to claim 3 wherein said means for actuating said switching means comprises means for actuating said switching means during alternate interpulse periods of the radar system.

5. In a canceller circuit, a canceller stage including delay means, and means for providing interrupted feedback from an output of said canceller stage to an input of said delay means.

6. In a canceller circuit, a plurality of canceller stages and means for providing interrupted feedback from the output of one of said canceller stages and to an input of a delay means included in another of said canceller stages.

7. A canceller circuit comprising: a canceller stage, including delay means and further comprising means for providing to the input of said delay means an interrupted input equivalent to a cancelled output from the output of said canceller stage.

8. A canceller circuit comprising: a plurality of canceller stages and further comprising means for providing to an input of a delay means in one of said canceller stages an interrupted input equivalent to a cancelled output from the output of another of said canceller stages.

* * * * *